United States Patent
Kurtz et al.

(10) Patent No.: US 6,941,816 B2
(45) Date of Patent: Sep. 13, 2005

(54) TRANSDUCER WITH INTEGRAL SWITCH FOR WIRELESS ELECTRONICS

(75) Inventors: Anthony D. Kurtz, Ridgewood, NJ (US); David Kerr, Mendham, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

(21) Appl. No.: 10/722,029

(22) Filed: Nov. 25, 2003

(65) Prior Publication Data

US 2005/0109116 A1 May 26, 2005

(51) Int. Cl.[7] .............................................. G01L 7/00
(52) U.S. Cl. ........................................ 73/756; 73/753
(58) Field of Search ................................. 73/700–756

(56) References Cited

U.S. PATENT DOCUMENTS

| | | | | |
|---|---|---|---|---|
| 6,176,138 B1 * | 1/2001 | Barr et al. | ..................... | 73/756 |
| 6,267,010 B1 * | 7/2001 | Hatanaka et al. | ............. | 73/756 |
| 6,484,587 B2 * | 11/2002 | Gul | ............................. | 73/756 |
| 6,612,178 B1 | 9/2003 | Kurtz et al. | ................... | 73/715 |
| 6,823,718 B2 * | 11/2004 | Sandford et al. | ............... | 73/37 |

* cited by examiner

*Primary Examiner*—William Oen
*Assistant Examiner*—Jermaine Jenkins
(74) *Attorney, Agent, or Firm*—Plevy, Howard & Darcy PC

(57) ABSTRACT

There is disclosed a transducer with an integral switch for wireless electronics. Essentially, the transducer contains a housing which includes a sensor device. The sensor device may be a piezoresistive Wheatstone bridge arranged in a conventional manner. The output of the bridge is coupled to a typical amplifying circuit or an analog-to-digital converter whose signal is coupled to a suitable transmitting means. The signal provided by the Wheatstone bridge is transmitted through RF, infrared or some other wireless transmission scheme to a remote location. Such transmissions schemes are well known. Associated with the sensor and secured to the sensor housing, is a push button switch which is wired in series with a battery. The battery operates to energize the sensor, including all the electronics when the sensor is in placed in a pressure sensing position. When the pressure is placed in a pressure sensing position, the push button switch, is actuated to apply operating bias to the transducer device.

8 Claims, 3 Drawing Sheets

TRANSDUCER WITH INTEGRAL SWITCH FOR WIRELESS ELECTRONICS

FIELD OF INVENTION

This invention relates to pressure transducers in general and, more particularly, to a pressure transducer which can transmit an output pressure signal via a wireless communications link.

BACKGROUND OF THE INVENTION

As one can ascertain, pressure transducers are widely known and widely employed in the prior art. The assignee herein, Kulite Semiconductor Products, Inc., is a prominent manufacturer of pressure transducers and has many patents relating to such devices. Many pressure transducers operate in harsh environmental conditions. In this manner, they are operated at extremely high temperatures and extremely high pressures. Examples of such transducers are well known. For a general aspect of such transducers, reference is made to U.S. Pat. No. 6,612,178 entitled, "Leadless Metal Media Protected Pressure Sensor" which issued on Sep. 2, 2003 to Anthony D. Kurtz et al., the inventor herein and is assigned to Kulite. This is just one example of a semiconductor pressure transducer used in applications which require operation in harsh environments that are corrosive and/or involve high temperature. While the transducer of this invention can be employed in harsh environments, it is understood that it can be used in any environment.

Most transducers, as can be ascertained, operate as wired devices. A typical pressure transducer contains a Wheatstone bridge, or other bridge arrangement, which basically comprises piezoresistive sensors accordingly arranged. While the present invention preferably uses piezoresistive devices, it is understood that the concepts herein can be utilized with any type of pressure sensor.

As indicated, in most environments, the pressure transducers are hard-wired into circuitry, which circuitry also interfaces with external equipment by means of hard wire connections.

It is an objective of the present invention to provide a transducer which will operate to transmit a radio signal or a transmitted wireless signal to a remote location. Such transmission is conventional and is well known and, for example, such remote transmitters have been used in conjunction with various types of sensors. A major aspect of the present invention is to use a pressure transducer in conjunction with a battery, which battery supplies operating potential to the transducer as well as the associated electronic circuitry. One aspect of the present invention is to utilize the battery to operate the transducer and associated electronics, but only when the pressure transducer is placed and positioned in an environment which is to be monitored. Thus, there is no power drain from the battery when the transducer is not in position. There is a switch which is activated when the transducer is placed in a pressure sensing mode and the switch connects the battery to the electronics enabling the transducer to be utilized as a wireless device, only when the transducer is placed in an operative position.

Other aspects of the present invention will be understood when reference is made to the Figures as included herein.

SUMMARY OF INVENTION

There is disclosed a transducer with an integral switch for wireless electronics. Essentially, the transducer contains a housing which includes a sensor device. The sensor device may be a piezoresistive Wheatstone bridge arranged in a conventional manner. The output of the bridge is coupled to a typical amplifying circuit or an analog-to-digital converter whose signal is coupled to a suitable transmitting means. The signal provided by the Wheatstone bridge is transmitted through RF, infrared or some other wireless transmission scheme to a remote location. Such transmissions schemes are well known. Associated with the sensor and secured to the sensor housing, is a push button switch which is wired in series with a battery. The battery operates to energize the sensor, including all the electronics when the sensor is in placed in a pressure sensing position. When the transducer is placed in a pressure sensing position, the push button switch, is actuated to apply operating bias to the transducer device.

DETAILED DESCRIPTION OF THE FIGURES

Figure 1:
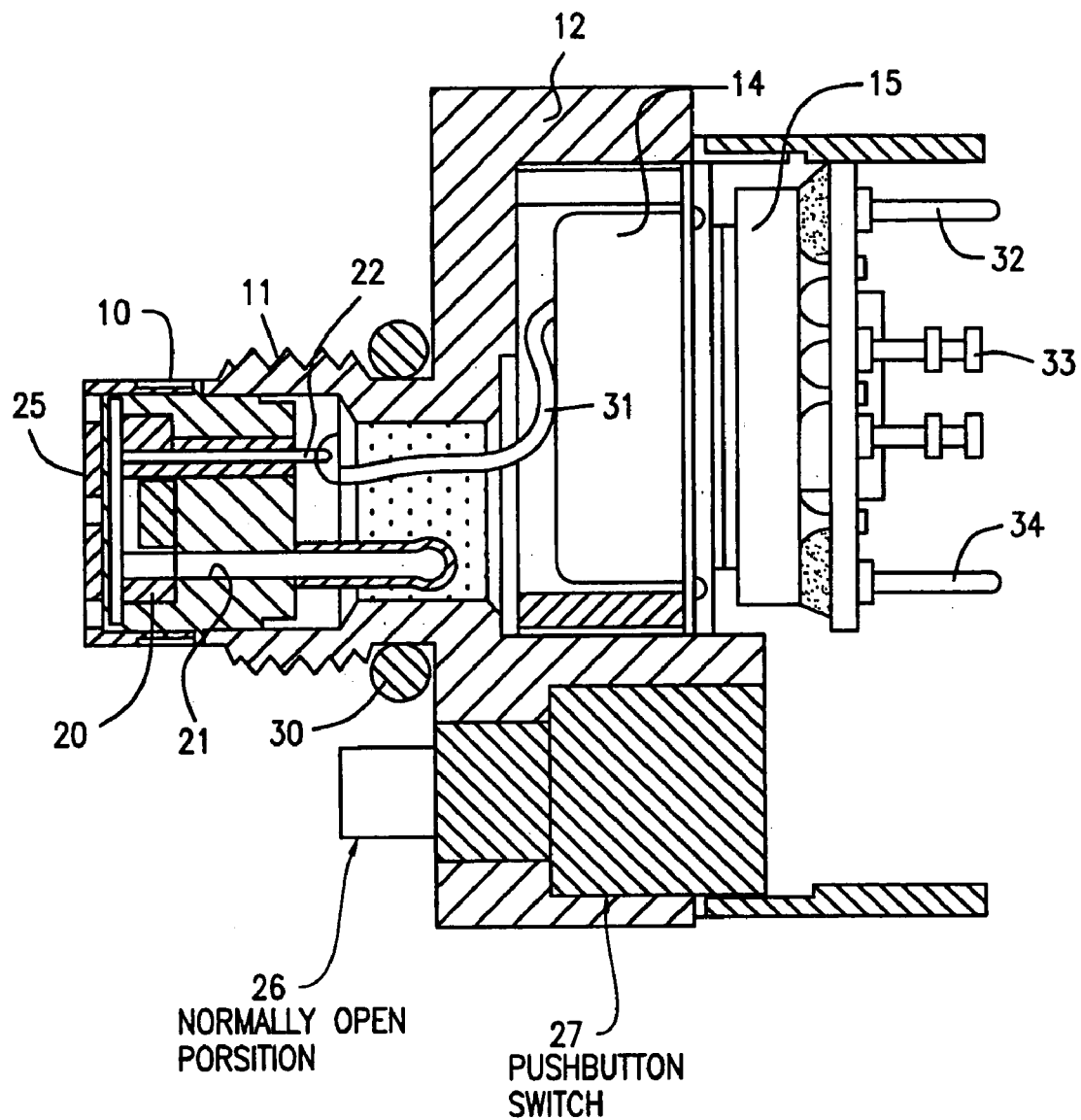
FIG. 1 is a cross sectional view of a transducer with an integral switch for wireless electronics according to this invention.

FIG. 1 shows a cross sectional view of a typical transducer with an integral switch for wireless electronics. As seen in FIG. 1, the transducer is included in the housing 12. The housing 12 has an O-ring 30 which enables the housing to form a tight seal when the transducer is inserted into a pressure monitoring environment. As seen, the housing 12 also includes a threaded portion 11, which threaded portion is inserted into a cooperating aperture when the transducer is to monitor a pressure in a particular environment. The sensor configuration is shown by reference numeral 20 and may, for example, be a silicon sensor employing piezoresistive devices. As indicated, these devices are typically arranged in a Wheatstone bridge configuration. A protective screen 25 may be placed above the sensor configuration 20 to prevent particles from the environment from impinging or otherwise hitting the diaphragm. The semiconductor sensor 20 has leads designated as 10 and 21 emanating from the piezoresistor bridge. As seen, there are wires or a cable 31 associated with the transducer with the wires 31 directed to a battery 14. The battery 14 is also connected and operative to bias circuitry located on an electronic circuit board 15. The circuit board 15 contains various electronic processing elements including, for example, a transmitter which is capable of transmitting an electrical signal indicative of the detected pressure to a remote location. The transmission scheme can employ many different well known techniques such as radio frequency, Blue Tooth, or other remote transmission techniques, infrared and so on. There are many other ways of transmitting an analog or digital signal to a remote location without the use of wires. As seen, the electrical circuit board also has output leads as, for example, 32, 33 and 34 in the event the circuit has to be hard wired.

As seen in FIG. 1, there is shown a switch 27, which has a push button actuator 26. The switch 27 is normally in the open position and is connected to the battery such that when the push button 26 actuates, the switch 27 is operative to connect the battery to the circuitry. This enables the transducer to operate only when the transducer is installed in a pressure monitoring system.

Figure 2:
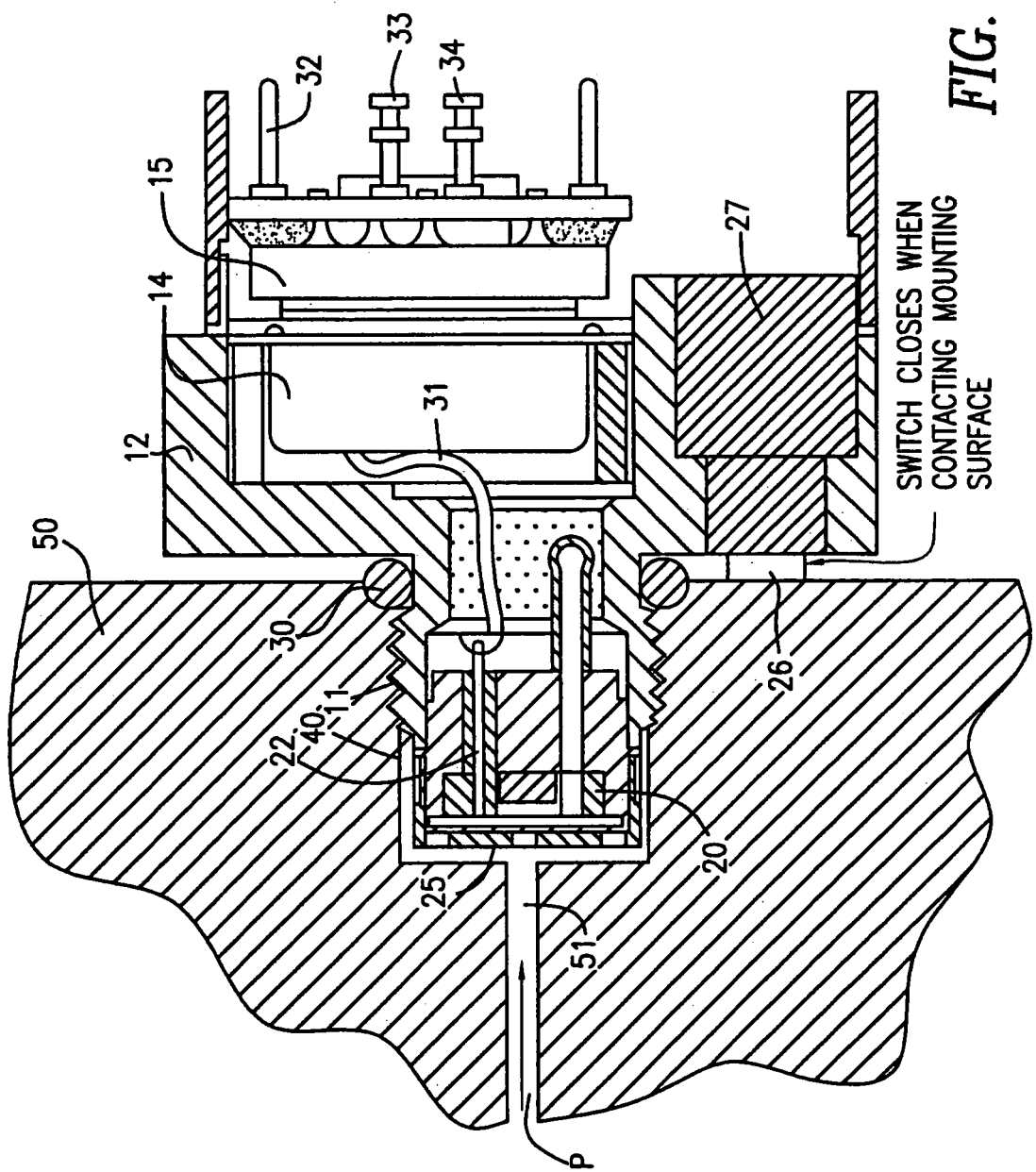
FIG. 2 is a diagram depicting the transducer located in a pressure sensing environment with the switch activated according to this invention.

Referring to FIG. 2 there is shown the pressure transducer of FIG. 1 positioned and located within a bore 40 of a unit 50 for a pressure monitoring operation. The bore 44 is an aperture 40 which is drilled and has a threaded portion corresponding to the threaded portion 11 of the housing 12 so that the transducer assembly, as shown, can be screwed in or otherwise placed in the aperture to communicate with the pressure port 51. A pressure P is applied to the sensor device 20 located in the housing 12.

As one can see from FIG. 2, the bore is formed in a wall or other area 50 of a suitable device. The wall 50 may be that of a housing of an engine or some other pressure producing device. As seen, when the pressure transducer is in place within the bore, the O-ring 30 bears up against the surface to provide a pressure seal to prevent any liquid or material being monitored by the transducer from leaking.

FIG. 2 utilizes the same reference numerals to depict the parts shown in FIG. 1. As seen in FIG. 2, when the transducer assembly is firmly inserted into the wall 50 via the aperture 40, the push button 26 operates. The transducer, once screwed into the aperture, causes the push button to abut against the wall and eventually go from its normally open position to a normally closed position, thereby connecting the battery 14 to the sensor and electronic circuitry. In this manner, the transducer, when placed in an operating environment, is operational in that it receives operating bias from the battery 14. If the transducer is not positioned in the bore, the switch 27 is normally opened and therefore, there is no connection of the battery 14 to the electronic circuitry. It is thus seen that the above described apparatus depicts a switch which is operative only when the transducer is installed in an operating environment to connect the battery to the various electronic components, including the piezoresistor sensor bridge and to therefore, enable operation in a wireless condition only during insertion of the transducer into a pressure monitoring atmosphere.

Figure 3:
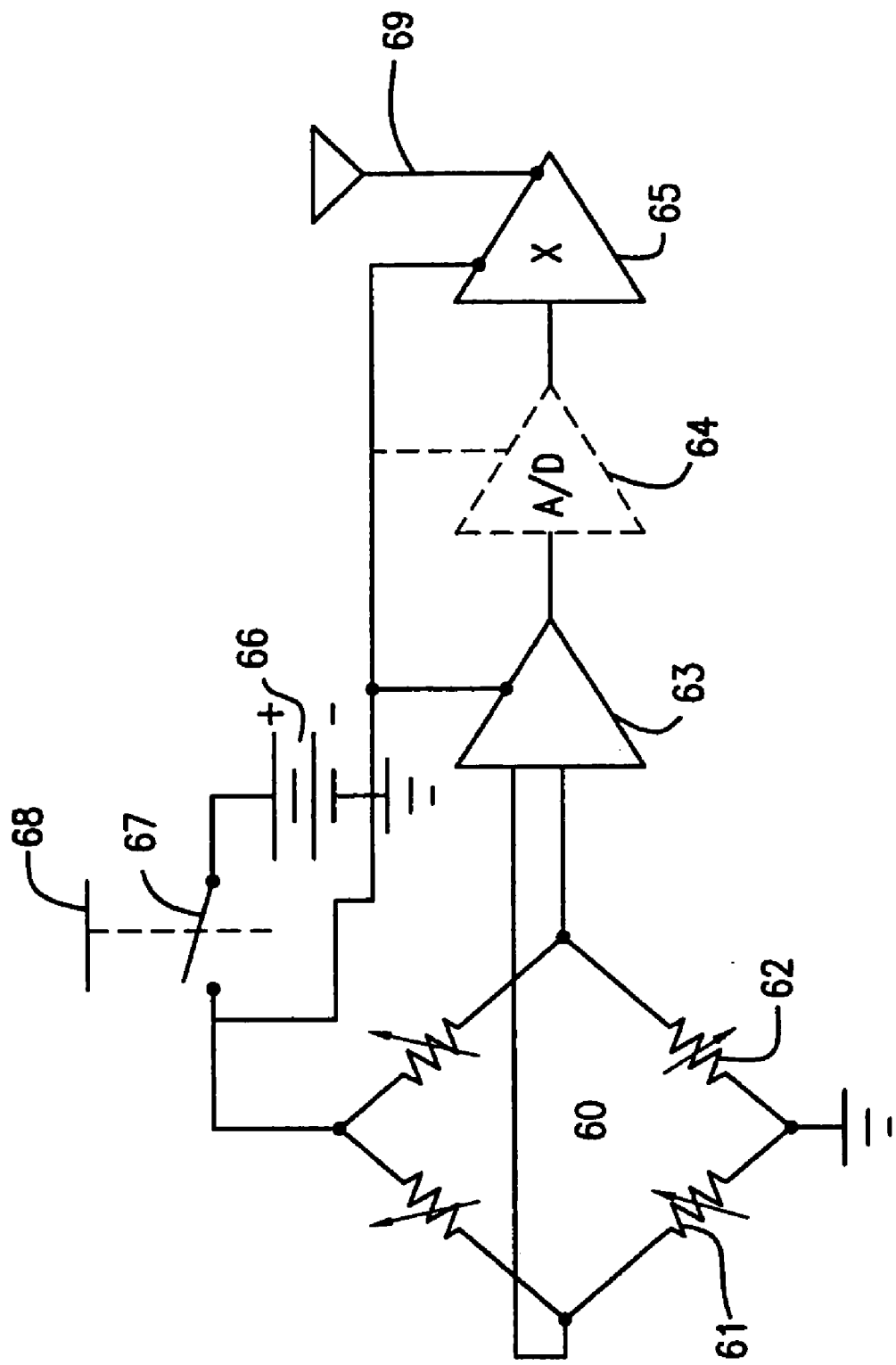
FIG. 3 is a simple schematic of a transducer with an integral switch according to this invention according to this invention.

Referring to FIG. 3, there is shown a circuit schematic depicting the electronic circuitry associated with the transducer for wireless electronics. As one can see, the sensor arrangement, which is depicted as 20 of FIG. 1, basically consists of a Wheatstone bridge 60 which includes piezoresistors 61 and 62. Although piezoresistors are employed in a preferred embodiment, it is understood that any sensing device can be utilized in order to accommodate this invention. The main aspect of the invention is to enable a pressure sensor to be battery operated and to only operate when the pressure sensor is located in a pressure sensing environment. As seen, the bridge 60 receives a biasing voltage via the switch 67 through battery 66. Switch 67 is shown in the open position and basically, is analogous to switch 27 of FIG. 1. Switch 67 is operated by a push button actuator 68, whereby when a force is exerted on button 68, the switch goes from the open position to the closed position. As one can ascertain, in this position the battery 66 applies operating voltage to the bridge. As also can be seen, the output of the bridge is coupled to a differential amplifier 63 which may be coupled to the input of an analog-to-digital converter which converts the voltage output from the bridge into a digital signal. This digital signal can be applied to a transmitter device 65 associated with a small antenna 69. The transmitter device can operate to modulate a suitable carrier, such as an RF signal. The antenna 69 can be a simple loop antenna or it can be, for example, included as one of the modules shown in FIG. 1 as, for example, module 32 can be a simple dipole antenna.

The means of transmitting the signal from the sensor to a remote location via the antenna 69 can take a plurality of different forms. These forms, for example, can include infrared, RF, Blue Tooth or some other conventional well known way of transmitting data via a wireless link. A main aspect of the invention is to enable data from a pressure transducer to be transmitted wirelessly only when the pressure transducer is in an operative position. The unit operates automatically when it is in position, whereby the switch 67 is activated when the transducer is placed in position, as shown in FIG. 2. The operation of the switch supplies operating bias from the battery 66 through the switch 67 to the piezoresistive bridge to the amplifier 63 and associated electronics, such as the transmitter and other processing circuitry 64 and 65.

An advantage of this device is that it can be positioned in many different environments to allow remote transmission without wires. This can be helpful in harsh environments where wires could not be easily used or in another difficult area where wireless transmission is desirable.

It is understood by those skilled in the art that there are many alternate embodiments which can be conceived in order to perform similar functions of the apparatus described above and all these are deemed to be encompassed within the spirit and scope of the invention described herein.

What is claimed is:

1. A pressure transducer for transmitting a pressure signal to a remote location indicative of the pressure measurement of a monitored location, comprising:

a housing having at least one pressure port for receiving a pressure, said housing having an internal hollow communicating with said pressure port, a pressure sensor located within said housing and communicating with said port to provide an output indicative of the magnitude of a pressure applied to said port when said sensor is biased to operate, a remote transmitter positioned on said housing and coupled to said sensor to transmit a wireless signal indicative of said pressure when said transmitter is biased to operate, selectively operated means coupled and operative to apply operating bias to said sensor and transmitter automatically when said housing is secured to a device for pressure measurement.

2. The pressure transducer according to claim 1 wherein said selectively operated means is a push button switch mounted on said housing and actuatable upon insertion of said housing pressure port into an aperture of said monitored device for pressure measurement, said switch operative to close upon activation of said push button to apply an operating bias to said sensor and transmitter.

3. The pressure transducer according to claim 1 wherein said pressure sensor includes a piezoresistive Wheatstone bridge.

4. The pressure transducer according to claim 1 wherein said transmitter is an RF transmitter.

5. The pressure transducer according to claim 1 wherein said transmitter is a Blue Tooth transmitter.

6. The pressure transducer according to claim 2 wherein said switch has one terminal coupled to a battery which battery applies said operating bias to said sensor and transmitter when said switch is closed.

7. The pressure transducer according to claim 1 further comprising an amplifier having an input responsive to said output of said pressure sensor to provide an amplified signal at an output terminal of said amplifier with said output terminal of said amplifier coupled to an input of said transmitter.

8. The pressure transducer according to claim 1 wherein said transmitter is coupled to an antenna for radiating said signal to a remote location.

* * * * *